(12) United States Patent
Bourdon et al.

(10) Patent No.: US 9,094,656 B2
(45) Date of Patent: Jul. 28, 2015

(54) METHOD FOR SEQUENTIALLY DISPLAYING A COLOUR IMAGE

(75) Inventors: Pascal Bourdon, Chevaigne (FR); Sylvain Thiebaud, Noyal sur Vilaine (FR); Jean-Jacques Sacre, Chateaugiron (FR)

(73) Assignee: Thomson Licensing (FR)

( * ) Notice: Subject to any disclaimer, the term of this patent is extended or adjusted under 35 U.S.C. 154(b) by 351 days.

(21) Appl. No.: 13/199,501

(22) Filed: Aug. 31, 2011

(65) Prior Publication Data

US 2012/0062581 A1 Mar. 15, 2012

(30) Foreign Application Priority Data

Sep. 13, 2010 (FR) .................................... 10 57280

(51) Int. Cl.
G09G 5/02 (2006.01)
H04N 5/913 (2006.01)
H04N 9/31 (2006.01)
H04N 9/64 (2006.01)

(52) U.S. Cl.
CPC ............... *H04N 5/913* (2013.01); *H04N 9/312* (2013.01); *H04N 9/3114* (2013.01); *H04N 9/3182* (2013.01); *H04N 9/646* (2013.01); *H04N 2005/91392* (2013.01)

(58) Field of Classification Search
USPC ......................................................... 380/213
See application file for complete search history.

(56) References Cited

U.S. PATENT DOCUMENTS

| 6,021,005 | A * | 2/2000 | Cathey et al. ................ 359/737 |
| 6,147,720 | A | 11/2000 | Guerinot et al. |
| 6,191,826 | B1 | 2/2001 | Murakami et al. |
| 6,256,073 | B1 | 7/2001 | Pettitt |
| 6,301,384 | B1 * | 10/2001 | Webb ............................ 382/167 |
| 6,597,807 | B1 | 7/2003 | Watkins et al. |
| 6,648,475 | B1 | 11/2003 | Roddy et al. |
| 2003/0072037 | A1 | 4/2003 | Hamilton |
| 2003/0091232 | A1 * | 5/2003 | Kalevo et al. ................ 382/167 |
| 2004/0081318 | A1 | 4/2004 | Bilobrov et al. |

(Continued)

FOREIGN PATENT DOCUMENTS

| CN | 101026771 | 8/2007 |
| CN | 101156432 | 4/2008 |

(Continued)

OTHER PUBLICATIONS

Bourdon, P., Thiebaud, S., Sacré, J. J., & Doyen, D. (Jul. 2010). A metamerism-based method to prevent camcorder movie piracy in digital gital theaters. In Multimedia and Expo (ICME), 2010 IEEE International Conference on (pp. 468-473). IEEE.*

(Continued)

*Primary Examiner* — Vikkram Bali
*Assistant Examiner* — Tracy Mangialaschi
(74) *Attorney, Agent, or Firm* — Jack Schwartz & Associates, PLLC

(57) ABSTRACT

Method in which a component image associated with a primary color of green hue is processed in a suitable manner to reduce the spatial frequencies corresponding to the transition zones in this component image and in which a plurality of component images including the processed component image are successively displayed. Thanks to the invention, the color break-up defects are noticeably reduced. The invention applies especially to anti-piracy image display methods.

8 Claims, 3 Drawing Sheets

(56) References Cited

U.S. PATENT DOCUMENTS

| | | | |
|---|---|---|---|
| 2005/0179978 A1* | 8/2005 | Lee et al. | 359/237 |
| 2006/0152524 A1 | 7/2006 | Miller et al. | |
| 2006/0232545 A1 | 10/2006 | Sekiguchi | |
| 2007/0121996 A1 | 5/2007 | Blonde et al. | |
| 2007/0165317 A1* | 7/2007 | Thollot et al. | 359/892 |
| 2007/0200866 A1 | 8/2007 | Lee et al. | |
| 2009/0003650 A1 | 1/2009 | Vigouroux et al. | |
| 2009/0121993 A1 | 5/2009 | Masumura | |
| 2011/0025702 A1 | 2/2011 | Lionti | |

FOREIGN PATENT DOCUMENTS

| | | |
|---|---|---|
| CN | 101325028 | 12/2008 |
| CN | 101436391 | 5/2009 |
| EP | 1414250 | 4/2004 |
| EP | 2134089 | 12/2009 |
| FR | 2866443 | 8/2005 |
| JP | 2004325809 | 11/2004 |
| WO | WO0195544 | 12/2001 |
| WO | WO0219724 | 3/2002 |
| WO | WO2005048237 | 5/2005 |
| WO | WO2006106453 | 10/2006 |
| WO | WO2007071678 | 6/2007 |
| WO | WO2008107307 | 9/2008 |
| WO | WO 2009150088 A1 * | 12/2009 |

OTHER PUBLICATIONS

Bourdon et al., "A Metamerism-Based Method to Prevent Camcorder Movie Piracy in Digital Theatres", ICME 2010, 2010 IEEE.
Search Report dated Apr. 21, 2011.

* cited by examiner (a) Achromatic CSF

METHOD FOR SEQUENTIALLY DISPLAYING A COLOUR IMAGE

This application claims the benefit, under 35 U.S.C. §119 of FR Patent Application 1057280, filed 13 Sep. 2010.

TECHNICAL FIELD

The invention relates to a sequential method for displaying colour images. The invention also relates to the display of images into which a jamming pattern invisible to the eye but detectable by a camcorder has been inserted in order to discourage image piracy in projection rooms.

BACKGROUND

In conventional display with three primary colours, two types of digital devices for displaying images by projection are known:

the projectors having a microimager for each primary "channel": for the display of an image (generally of the LCD or LCOS type), each microimager then forms a component image of this image to be displayed, a first one of red hue, a second one of green hue and a third one of blue hue; these three component images form the same series for the display of this image; the various microimagers are imaged by an optical system on the same screen in such a way that the component images of this same series are displayed simultaneously on the screen to form the image to be displayed; this is the first conventional display method of the prior art;

the projectors having a single microimager for all the primary "channels" (generally of the "DMD", i.e. "Digital Micromirror Devices", type); these projectors generally have a coloured wheel (or an equivalent device) which enables the single microimager to be sequentially illuminated using each display primary colour. The single microimager then successively forms each component image: a first one of red hue, a second one of green hue and a third one of blue hue; each component image forms a different series; the microimager is imaged by an optical system on a projection screen in such a way that the component images of each series are successively displayed on the screen to form, by colour fusion in the observer's eye, the image to be displayed; this is the second conventional display method of the prior art. This successive display then produces a flicker to which the eye can under certain circumstances be sensitive. The eye then perceives a colour break-up defect which can be disturbing. It is noted that this artefact is indeed all the more visible as the contour on which it appears is sharp, i.e. that it contains high spatial frequencies. These contours are located, by definition, in image transition zones; conversely, the transition zones with low spatial frequency generally, but not always, reflect the absence of contours.

The display method according to the invention therefore uses the second display method of the prior art and, optionally, in addition the first one; the projector therefore has a microimager for each series of component images. One purpose of the invention is to reduce the colour break-up defect.

It is known that the human vision has very particular characteristics for the perception of the spatiotemporal contrasts. In particular, these differ according to the eye retina illumination. The retinal illumination is measured in particular in trolands, where 1 Tr is 1 $Cd/m^2$ for an opening of the eye pupil of 1 $mm^2$. For a given retinal illumination and a constant flicker amplitude, the perception that a human observer will have of a temporal and/or spatial oscillation for a first wavelength, for example around 450 nm (blue), will not be the same as the one he may have of this same oscillation for a second wavelength different from the first one, for example 520 nm (green).

Examples drawn from the literature on the eye sensitivity variations according to the contrast temporal frequencies and/or contrast spatial frequencies (vertical and/or horizontal oscillations) are illustrated in the following figures:

FIG. 1: according to the temporal oscillation frequency expressed in cycles per second ("cps" or Hertz) and to the retinal illumination for a white light and a null spatial oscillation frequency;

FIG. 2: according to the spatial oscillation frequency (expressed in cycles per degree ("cpd") and to the wavelength expressed in the form of colour hues, for a constant retinal illumination and a null temporal oscillation frequency;

FIGS. 3 and 4: according to the temporal oscillation frequency expressed in Hertz and to the spatial oscillation frequency expressed in cycles per degree ("cpd"), for a white light ("achromatic") and a constant retinal illumination.

According to these last two figures, it is noted that the sensitivity to the temporal contrast decreases with the frequency of the spatial oscillations, as soon as the frequency is less than 8 cpd and 10 Hz approximately.

SUMMARY OF THE INVENTION

To reduce the colour break-up defect, it is proposed, according to the invention, to reduce the spatial frequencies corresponding to the spatial transition zones in the component image or the component images of the hue(s) with the highest sensitivity to the temporal contrast. It is then noted that the sensitivity to the temporal contrast in these hues is reduced and that the colour break-up defects are then reduced.

For this purpose, the purpose of the invention is a method for displaying colour images where each image is formed of multiple component images, where each pixel of a component image expresses the colour component of this pixel in a predetermined display primary colour, where said plurality comprises at least one component image in a primary colour of green hue, in which, for each image:

various series of component images of said plurality are successively displayed, each series comprising at least one component image, all the component images of the same series are simultaneously displayed, wherein said method comprises, prior to said successive displays, a processing of a portion of at least one component image associated with the primary colour of green hue suitable to reduce the spatial frequencies corresponding to the transition zones in said portion of the component image associated with the primary colour of green hue without modifying for all that the spatial frequencies corresponding to the same transition zones in the corresponding portions of the component images associated with a primary colour different from said primary colour of green hue.

According to the invention, a spatial filtering processing of a portion, optionally of the entire component image of green hue, is therefore performed. This filtering is appropriate to reduce the spatial frequencies corresponding to the transition zones in the component image of green hue. For the display of one image, this processing is not applied to the corresponding zones of the other component images if the hue of the associated primary colour is not green. "Corresponding portions of the other component images" are understood to mean the portions of these images which are formed of the same pixels as those of the processed portion of the component image of green hue. Preferably, said processed portion of at least one component image associated with the primary colour of green hue comprises all the pixels of this image. Therefore, the entirety of the component image is then processed.

Thanks to the invention, a noticeable reduction of the colour break-up defects is noticed.

Note that such a spatial filtering specifically of the component image of green hue is described in the prior art for quite different applications:

in the U.S. Pat. No. 6,301,384 document: the spatial "noise" is only reduced in the component image associated with the primary colour to which the eye is the most sensitive, instead of reducing the noise in all the component images; gains in noise removal processing time are made in this way;

in the U.S. Pat. No. 6,597,807 document within the context of obtaining depth information from matched 3D image pairs: the green hue is assigned to the component image with the smallest spatial frequencies.

Note that, in the invention, the plurality of component images can comprise several component images in the same primary colour. But, preferably, the component images form the same image in primary colours of different hues. The primary colours can be classically of red, green and blue, and also yellow, cyan, magenta hues and still other hues.

According to a first variant, the method according to the invention comprises a step for inserting a jamming pattern into said images, where the insertion of a pattern into an image is made by a first modification of the values of the colour components of a group of pixels of a first group of component images of said image, and by a second modification, opposed to the first one, of the values of the colour components of the same group of pixels of a second group of other component images of said image, in such a manner that said first modification and said second modification cancel each other out upon display, by colour fusion, and where said processed portion of at least one component image associated with the primary colour of green hue corresponds to said jamming pattern.

Such a jamming pattern insertion is particularly described in the US2007/121996 document. Thanks to the processing described above of a given group of pixels of the image to be displayed, the pattern made up of these pixels will appear to the human eye with a colour identical to the colour which would have appeared to this eye without pattern insertion. The images to be displayed are altered by the insertion of this pattern without an observer being capable of distinguishing it upon display, in particular on a projection screen. However, the capture and the recording of images with pattern by a camcorder aimed at this screen would become, thanks to the invention, very difficult to display on another display device, since the pattern would then become very visible for an observer because of the temporal characteristics of image sampling of the video cameras. Implemented in this way, the invention advantageously reinforces the efficiency of the image anti-piracy method called "with temporal modulation" such as described in particular in the US2007/121996 document.

Preferably, the plurality of component images then comprises several component images in the same primary colour. It is indeed possible to implement this anti-piracy method by means of a device only comprising three primary colours, in particular red, green and blue. A first series and a second series of component images comprise each a component image in each of the primary colours. The colour components of the pixels of the group forming the jamming pattern to be inserted are then different in the two series but the sum of these components is equal to the colour components of the same pixels before pattern insertion, as described in the US2007/121996 document. According to a second variant where the component images of said plurality correspond to at least four different primary colours, the method according to the invention comprises a step for inserting a jamming pattern into said images, where the insertion of a pattern into an image is made by a modification of the values of the colour components of a group of pixels of said image, said modification being made in such a manner that the colour generated by the display of each pixel the colour component values of which are modified are perceived by the human eye in the same manner as the colour generated by the display of the same pixel would have been perceived without modification of the values of its colour components, these two generated colours having different spectra with respect to wavelength, and where said processed portion of at least a component image associated with the primary colour of green hue corresponds to said jamming pattern.

Expressed in a colour space of the Human Visual System ("HVS"), the values of the colour components of each pixel of this group are, even after modification, identical to the values of the colour components of the same pixel before modification. This condition expresses that the colour generated by the display of this pixel after modification is metameric for the human eye of the colour which would have been generated by the display of this pixel before modification.

Such a jamming pattern insertion is particularly described in the EP1414250 (SONY) and US2009/003650 documents (THOMSON). This method requires more than three basic primary colours in such a manner as to benefit from a degree of freedom to be able to generate a same visual colour by means of different sets of component images. As previously but with a different method, the images to be displayed are altered by inserting this pattern without an observer being capable of distinguishing it upon display, in particular on a projection screen. However, the capture and the recording of images with pattern by a camcorder aimed at this screen would become, thanks to the invention, very difficult to display on another display device, since the pattern would then become very visible for an observer because of the different spectral characteristics of the video cameras in comparison with those of the human visual system. Implemented in this way, the invention advantageously reinforces the efficiency of the "metamerization" image anti-piracy method such as described in particular in the EP1414250 document (SONY).

The purpose of the invention is also a device for displaying colour images where each image is formed of multiple component images, where each pixel of a component image expresses the colour component of this pixel in the same predetermined display primary colour, where said plurality comprises at least one component image in a primary colour of green hue, in which, for each image:

suitable means to successively display various series of component images of said plurality, each series comprising at least one component image, on the one hand, and suitable to simultaneously display all the component images of the same series, on the other hand wherein it comprises means to process, prior to said successive displays, a portion of at least a component image in said primary colour of green hue, said processing being suitable to reduce the spatial frequencies corresponding to the transition zones in said portion of the component image in said primary colour of green hue without modifying for all that the spatial frequencies corresponding to the same transition zones in the corresponding portions of the component images in primary colours different from said primary colour of green hue. According to a first variant, the device for displaying images comprises means for inserting a jamming pattern into said images, adapted so that the insertion into each image is made by a first modification of the values of the colour components of a group of pixels of a first group of component images of said image, and by a second modification, opposed to the first one, of the values of the colour components of the same group of pixels of a second group of other component images of said image, said first modification and said second modification being adapted to cancel each other out upon display, by colour fusion, said processed portion of at least one component image in said primary colour of green hue then corresponding to said jamming pattern.

According to a second variant, the component images of said plurality correspond to at least four different primary colours and the device for displaying images comprises means for inserting a jamming pattern into said images, adapted so that the insertion into each image is made by a modification of the values of the colour components of a group of pixels of said image, said modification being made in such a manner that the colour generated by the display of each pixel the colour component values of which are modified is perceived by the human eye in the same manner as the colour generated by the display of the same pixel would have been perceived without modification of the values of its colour components, these two generated colours having different spectra with respect to wavelength, said processed portion of at least one component image in said primary colour of green hue then corresponding to said jamming pattern.

BRIEF DESCRIPTION OF DRAWINGS

The invention will be better understood upon reading the following description, provided as a non-restrictive example and referring to the annexed figures wherein.

DETAILED DESCRIPTION OF EMBODIMENTS OF THE INVENTION

Figure 1:
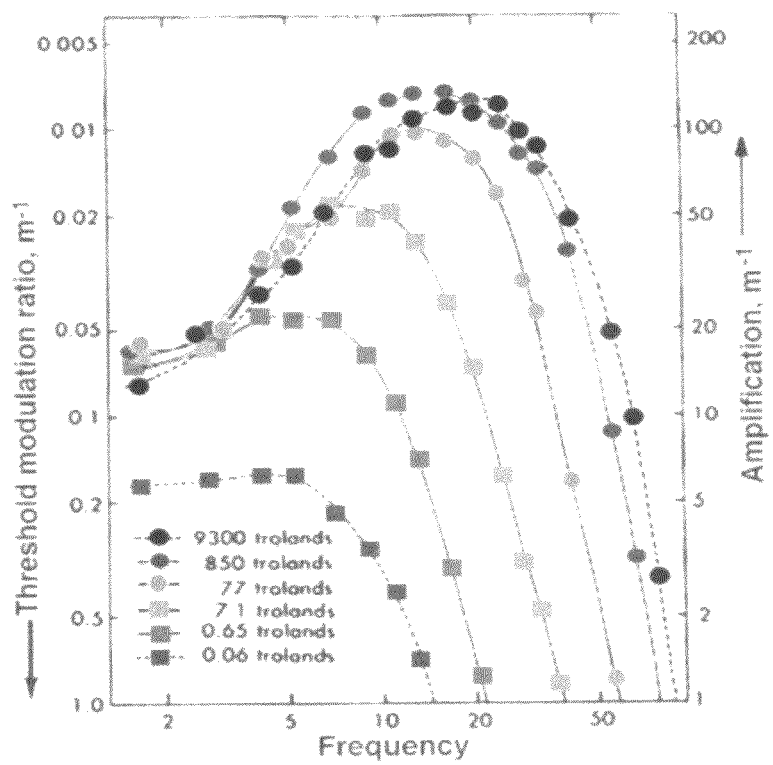
FIG. 1, already described, represents the contrast sensitivity function or "CSF" according to the temporal oscillation frequency expressed in cycles per second ("cps" or Hertz) and to the retinal illumination for a white light and a null spatial oscillation frequency.
Figure 2:
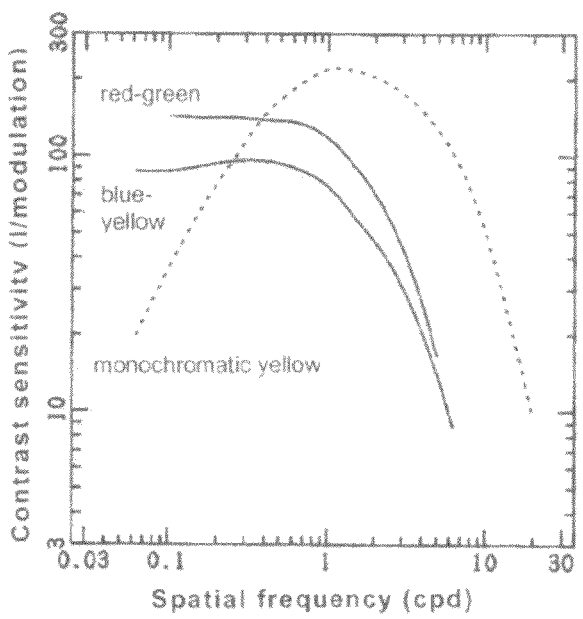
FIG. 2, already described, represents the contrast sensitivity function ("CSF") according to the spatial oscillation frequency (expressed in cycles per degree ("cpd") and to the wavelength expressed in the form of colour hues for a constant retinal illumination and an null temporal oscillation frequency.
Figure 3:
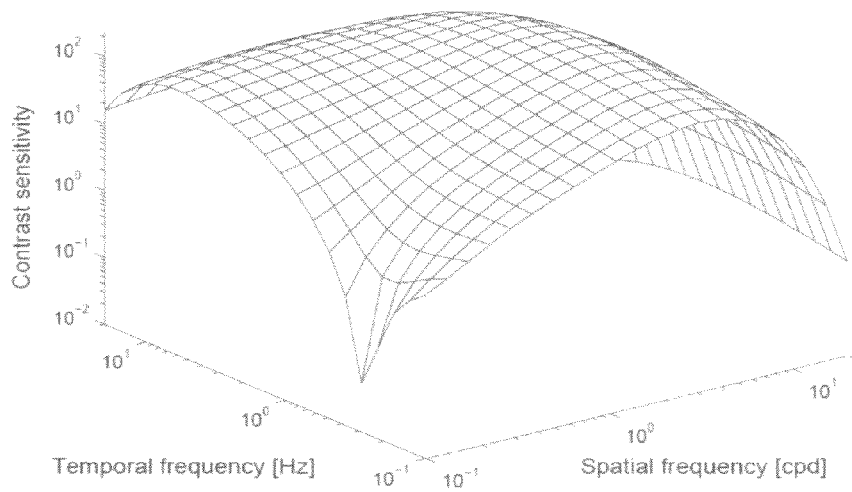
FIGS. 3 and 4, already described, represent the contrast sensitivity function ("CSF") according to the temporal oscillation frequency expressed in Hertz and to the spatial oscillation frequency expressed in cycles per degree ("cpd"), for a white light ("achromatic") and for a constant retinal illumination.
Figure 4:
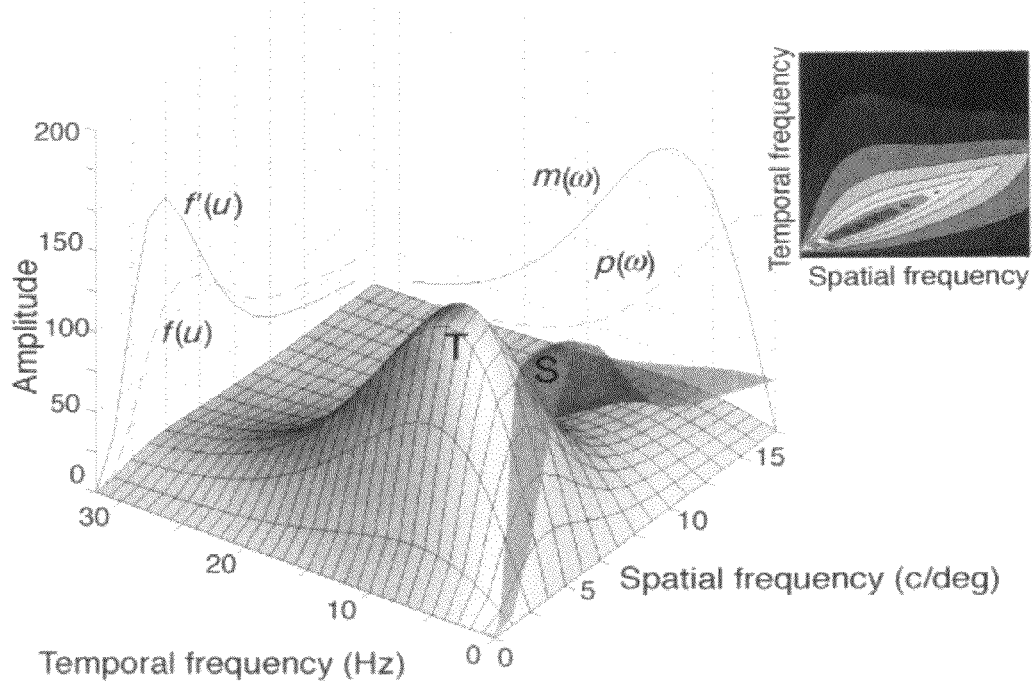
Figure 5:
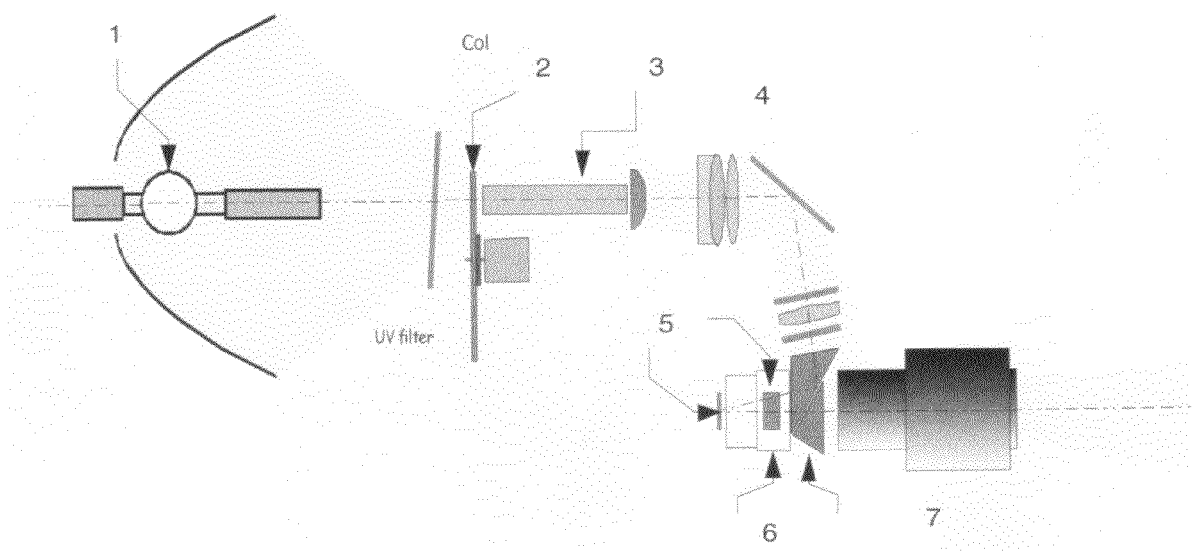
FIG. 5 diagrammatically illustrates a display device which is advantageously used for the implementation of the invention.

A device for displaying images capable of implementing the display method according to the invention will now be described. In reference to FIG. 5, this device comprises:

a polychromatic light source 1 with its reflector mirror, sending out an illumination beam of approximately white hue, a wheel 2 with two segments for colour filtering driven by a motor and positioned in such a manner that each filtering segment is illuminated successively by the illumination beam, a light tube for light integration 3, receiving, via its inlet section, the illumination beam at the outlet of a filtering segment, and providing, at its outlet section, a uniformly illuminated surface, three microimagers 5, a relay optical system 4, prism sets 6 and, if necessary, suitable colour filters to image simultaneously the outlet surface of the integration light tube 3 on each of the three microimagers 5, and suitable so that a first microimager is illuminated by an illumination beam of red hue, a second microimager is illuminated by an illumination beam of green hue, a third microimager is illuminated by an illumination beam of blue hue;

and a projection lens 7 suitable to image each microimager on the same projection screen (not represented);

where the prism sets 6 are also appropriate to recombine the modulated beams coming from each microimager and orient them at the inlet of the projection lens 7.

Figure 6:
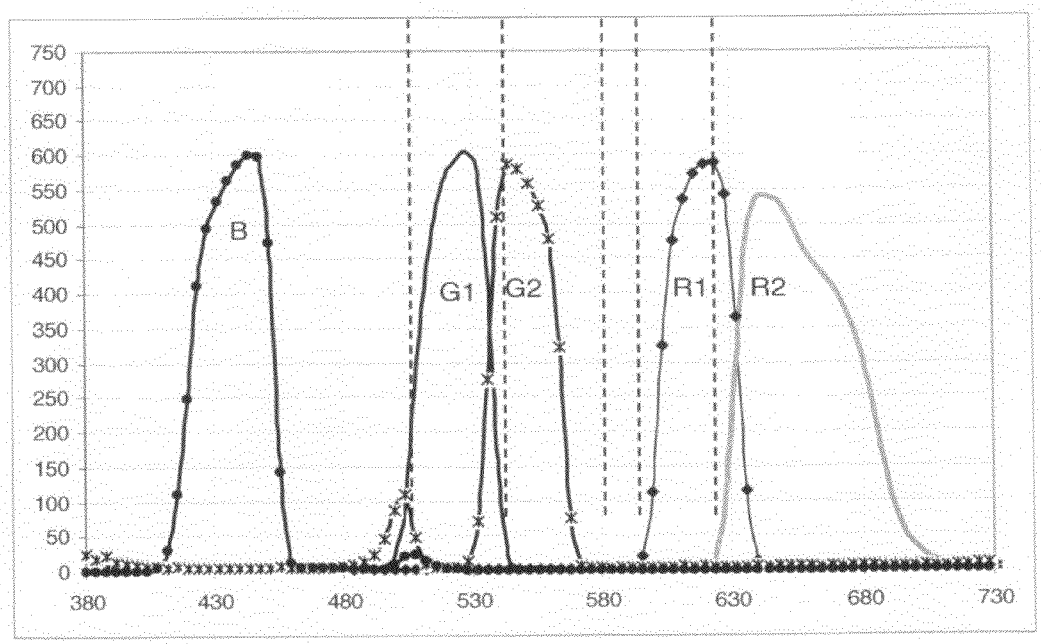
FIG. 6 represents the spectral distribution of the display primary colours of the device of FIG. 5.

Each filtering segment of the wheel 2 is passing in three different ranges of wavelengths: a red range, a green range and a blue range. The red ranges and the green ranges are different and separate for the first and the second filtering segment. The blue range is on the contrary common to the two filtering segments In reference to FIG. 6, such a display device is, according to the invention, suitable:

when the illumination beam of the source 1 intersects the first filtering segment of the wheel 2, to simultaneously and uniformly illuminate each microimager by means of an illumination beam of a specific primary colour presenting the spectral distribution R1, G1, and B, respectively;

when the illumination beam of the source 1 intersects the second filtering segment of the wheel 2 to simultaneously and uniformly illuminate each microimager by means of an illumination beam of a specific primary colour presenting the spectral distribution R2, G2, and B, respectively, where the spectral distributions R1 and G1 are different, respectively, from the spectral distributions R2 and G2.

The device for displaying images is therefore capable of displaying the images successively by means of a first series of three simultaneous primary colours having the spectral distributions R1, G1, and B, respectively, then by means of a second series of three simultaneous primary colours having the spectral distributions R2, G2, and B, respectively.

The images to be displayed are generally provided in a standard format with three primary colours of the RGB type. The device for displaying images also comprises image processing means.

These image processing means are firstly suitable to transform the image data from the standard format with three primary colours into a format suitable for the display by means of six primary colours (including, here, two identical blue colours): R1, G1, B of the first series, and R2, G2 and again B of the second series. More precisely, at the end of this transformation, each image is transformed into a plurality of component images, where each pixel of a component image expresses the colour component of this pixel in one of the predetermined display primary colours R1, G1 and B of the first series, and R, G2 and again B of the second series, in such a manner that each component image is associated with a display primary colour. These transformation means will not be described here in detail since they are known in particular of the U.S. Pat. No. 6,648,475, WO01/95544, U.S. Pat. No. 6,256,073, U.S. Pat. No. 6,191,826 and U.S. Pat. No. 6,147, 720 documents.

These image processing means are secondly suitable, according to the invention, to reduce the spatial frequencies corresponding to the transition zones in the component images associated with the primary colours of green hue G1, G2 without modifying the spatial frequencies corresponding to the same transition zones in the component images associated with the other primary colours R1, R2, and B, which are not of green hue. Hence, this processing is suitable so that, here, in the entire image to be displayed, the contours are less sharp in the component images associated with the primary colours of green hue G1, G2 than the same contours in the other component images R1, R2, and B, which are not of green hue.

The device for displaying images also comprises means for controlling each microimager according to the image data transmitted by the processing means and in synchronization with the rotation of the wheel 2 with two colour filtering segments. These control means are known in themselves and will therefore not be described here in detail.

The implementation of the display method according to the invention applied to the display of a colour image by means of the device previously described will now be described.

For each image to be displayed, the processing means first provide a plurality of component images, i.e. a component image for each display primary colour of the device. Then, still by means of these processing means applied only to the component images associated with the primary colours of green hue G1, G2, and applied here to all the pixels of these images, the spatial frequencies corresponding to the transition zones in these component images of green hue are reduced. The other component images associated with the other primary colours R1, R2, and B undergo no processing for the reduction of the spatial frequencies, so that in the plurality of component images delivered by the processing means, the spatial frequencies in the transition zones which relate to the same pixels are different according to the component images.

To display each image by means of the device described before, then proceed as follows:

when the illumination beam of the source 1 intersects the first filtering segment of the wheel 2 in such a way that each microimager is illuminated by means of an illumination beam of a specific primary colour R1, G1, and B, by a suitable and known in itself control of the microimagers by means of the control means, one simultaneously displays the component images associated with these primary colours R1, G1, and B of a first series;

then, when the illumination beam of the source 1 intersects the second filtering segment of the wheel 2 in such a way that each microimager is illuminated by means of an illumination beam of a specific primary colour R2, G2, and B, by the same control of the microimagers by means of the control means, one simultaneously displays the component images associated with these other primary colours R2, G2, and B of a second series.

So, each image is successively displayed by means of a first series of three simultaneous primary colours having the spectral distributions R1, G1, and B, respectively, then by means of a second series of three primary colours having the spectral distributions R2, G2, and B, respectively.

So, different series of component images are successively displayed, each series comprising here three component images.

For the display of a series of images, like of a video sequence, one successively proceeds as indicated above for each image of the sequence. Thanks to the invention, upon image display on the projection screen, an appreciable reduction of the colour break-up defects which originate from the wheel with colour filtering segments is noticed.

For each image to be displayed, we have seen that the component images correspond to five primary colours of different spectra R1, R2, G1, G2 and B. This makes it possible to advantageously use the invention for the insertion of an anti-piracy "metameric" pattern as described in the WO2009/150088 (THOMSON) document, which uses a display device analogous, except for the image processing, to that previously described. The display method then moreover comprises a step for inserting a jamming pattern into the images to be displayed. It is known that values of colour components in each of the primary colours are assigned to each pixel of an image to be displayed. The value of the colour component in the primary colour associated with this component image is assigned to each pixel of a component image of this image to be displayed. The insertion of a jamming pattern into at least an image to be displayed is made by a modification of the values of the colour components of a predetermined group of pixels of this image. This group of pixels forms the pattern. This modification is particularly described in the WO2009/150088 document. It is made in such a manner that the colour generated by the display of each pixel of which the values of colour components are modified is perceived by the human eye in the same manner as the colour generated by the display of the same pixel without modification of the values of its colour components would have been perceived. These two generated colours have different spectra with respect to the wavelength but are perceived in the same manner by the human eye, which means that these two generated colours are metameric for the human eye. Which also means that, expressed in a colour space of the Human Visual System or "HVS" like the CIE-XYZ or CIE-Lab space, these two generated colours have the same values of colour components. But, if these two generated colours are metameric for the human eye, they are generally no longer metameric for an image capture device like a camcorder. Which means that, expressed in the colour space of this image capture device, these two generated colours have different values of colour components. So, the jamming pattern will not be detected by the human eye on the projection screen, but will be detected by the image capture device on the same projection screen. In such a way that by displaying the recording made by the device for capturing the images displayed on the screen, the human eye will detect the jamming pattern and will be disturbed by this pattern in the display of the recorded images. The choice of the pixels of the predetermined group which forms the pattern is preferably appropriate in a manner known in itself to generate the maximum disturbance upon the display of the recording. This insertion of a jamming pattern is a very efficient arrangement in the fight against image piracy in projection rooms. Preferably, the spatial frequency reduction processing is then only applied to a portion of the component images associated with the primary colours of green hue G1, G2, this portion precisely corresponding to the jamming pattern. Only the predetermined group of pixels forming the jamming pattern is therefore concerned by the processing. Since the insertion of "metameric" patterns, which has just been described, requires display devices comprising at least four primary colours, an easy solution to have such devices is to insert a wheel with two colour filtering segments upstream of the illumination of the microimagers of a standard projector with three primary colours, so as to have a display device as previously described. But the insertion of such a wheel generates colour break-up defects which can make the jamming pattern inserted into the image visible on the screen.

These defects or temporal artefacts are all the more important:
- as the pattern contour is sharp, since a sharp contour results in the image in spatial frequencies located in the zone of maximum sensitivity to the contrast of the eye;
- as the retinal illumination is important (white pixels for example);
- as the temporal modulation percentage is high, the latter corresponding to the temporal dynamics of a pixel, i.e. to the retinal illumination difference between the display of the first series of component images and the display of the second series of component images.

The image processing according to the invention advantageously enables these defects to be limited.

The present invention has been described by referring to the use of a specific display device: it is obvious for those skilled in the art that it can apply to other display devices without leaving the scope of the claims hereafter.

The invention claimed is:

1. A method for displaying colour images, comprising, for each image:
   reducing colour break-up defect by spatial filtering each pixel of at least one component image of the colour image in said primary colour of green hue, where each colour image is formed of a plurality of component images, where each pixel of a component image expresses the colour component of this pixel in the same predetermined display primary colour, where said plurality comprises at least one component image in a primary colour of green hue, by modifying the spatial frequencies corresponding to transition zones of each pixel in said at least one component image in said primary colour of green hue without modifying the spatial frequencies corresponding to the same transition zones in the corresponding pixels in component images of the same image in primary colours different from said primary colour of green hue,
   sequentially displaying various series of said component images of said plurality, each series comprising at least one component image, the various series comprising the at least one spatial filtered component image, while simultaneously displaying all the component images of the same series.

2. The method for displaying images according to claim 1, wherein said modification of spatial frequencies corresponds to transition zones in the whole at least one component image in said primary colour of green hue.

3. The method for displaying images according to claim 1, further comprising inserting a jamming pattern into said images, where the insertion of a pattern into an image is made by a first modification of the values of the colour components of a group of pixels of a first group of component images of said image, and by a second modification, opposed to the first one, of the values of the colour components of the same group of pixels of a second group of other component images of said image, in such a manner that said first modification and said second modification cancel each other out upon display, by colour fusion, and where said portion of at least one component image in said primary colour of green hue corresponds to said jamming pattern.

4. The method for displaying images according to claim 3, wherein the plurality of component images comprises several component images in the same primary colour.

5. The method for displaying images according to claim 1, where the component images of said plurality correspond to at least four different primary colours, wherein it comprises a step for inserting a jamming pattern into said images, where the insertion of a pattern into an image is made by a modification of the values of the colour components of a group of pixels of said image, said modification being made in such a manner that the colour generated by the display of each pixel the colour component values of which are modified is perceived by the human eye in the same manner as the colour generated by the display of the same pixel would have been perceived without modification of the values of its colour components, these two generated colours having different spectra with respect to wavelength, and where said portion of at least one component image in said primary colour of green hue corresponds to said jamming pattern.

6. A device for displaying colour images, comprising:
   a device for displaying that sequentially displays various series of component images of a plurality of component images of an image, where each image is formed of said plurality of component images, where each pixel of a component image expresses the colour component of this pixel in the same predetermined display primary colour, where said plurality comprises at least one component image in a primary colour of green hue, each series comprising at least one component image, and, for each image, simultaneously displays all the component images of the same series; and
   an image processor that spatial filters, prior to said sequential displays, each pixel of at least one component image in said primary colour of green hue, said spatial filtering to reduce colour break-up defect by modifying the spatial frequencies corresponding to the transition zones of each pixel of the component image in said primary colour of green hue without modifying the spatial frequencies corresponding to the same transition zones in the corresponding pixels in the component images in primary colours different from said primary colour of green hue.

7. The device for displaying images according to claim 6, wherein the device for displaying inserts a jamming pattern into said images, so that the insertion of a pattern into an image is made by a first modification of the values of the colour components of a group of pixels of a first group of component images of said image, and by a second modification, opposed to the first one, of the values of the colour components of the same group of pixels of a second group of other component images of said image, said first modification and said second modification being appropriate to cancel each other out upon display, by colour fusion, said portion of at least one component image in said primary colour of green hue corresponding to said jamming pattern.

8. The device for displaying images according to claim 6, where the component images of said plurality correspond to at least four different primary colours, wherein it comprises means for inserting a jamming pattern in said images, so that the insertion into an image is made by a modification of the values of the colour components of a group of pixels of said image, said modification being made in such a manner that the colour generated by the display of each pixel the colour component values of which are modified is perceived by the human eye in the same manner as the colour generated by the display of the same pixel would have been perceived without modification of the values of its colour components, these two generated colours having different spectra with respect to wavelength, said portion of at least one component image in said primary colour of green hue corresponding to said jamming pattern.

* * * * *